United States Patent Office 3,118,919
Patented Jan. 21, 1964

3,118,919
DIENIC STEROIDS AND METHOD OF PREPARING THE SAME
John J. Brown, Pearl River, and Seymour Bernstein, New City, N.Y., assignors to American Cyanamid Company, Stamford, Conn., a corporation of Maine
No Drawing. Filed June 15, 1962, Ser. No. 202,705
8 Claims. (Cl. 260—397.45)

This invention relates to new steroid compounds. More particularly, it relates to 19-norandrosta-5(10),9(11)-dienes and 19-norpregna-5(10),9(11)-dienes and methods of preparing the same.

The new steroids of the present invention may be illustrated by the following structural formula:

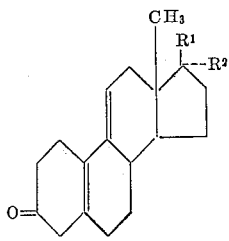

wherein $R^1$ is hydroxyl and $R^2$ is selected from the group consisting of vinyl, chloroethynyl.

The compounds of this invention are, in general, white crystalline solids, relatively insoluble in water but soluble in lower alkanols, ethyl acetate, acetone, tetrahydrofuran, methylene chloride and the like.

The compounds of the present invention are prepared from intermediates of the formula:

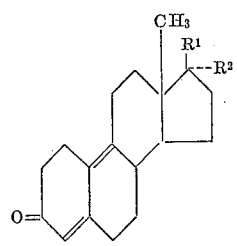

wherein $R^1$ is selected from the group consisting of hydroxyl and lower alkanoyl and $R^2$ is selected from the group consisting of hydrogen, methyl, vinyl and chloroethynyl. The preparation of these intermediates is described in the chemical literature as indicated hereinafter.

In order to prepare the present compounds, the intermediates are reacted with an orthoformate ester in a solvent at from about 10° to about 50° C. The orthoformate esters can be, for example, methyl orthoformate, ethyl orthoformate, etc. The solvents can be, for example, lower alkyl alcohols such as methanol, ethanol, propanol, etc. Also 1,4-dioxane-alcohol solvent mixture can be used as well as an excess of orthoformic ester. The reaction product is hydrolyzed with a strong acid such as, for example, sulfuric, hydrochloric, p-toluenesulfonic, perchloric acids or the like.

The present compounds are preferably recovered from the reaction mixture following hydrolysis by dilution with water and separation of the precipitate by filtration. The product is further purified by crystallization and recrystallization, is desired.

The compounds of the present invention such as 17β-hydroxy-17α-methyl-19-norandrosta-5(10),9(11)-dien-3-one are anabolic agents and useful in steroid therapy for this purpose. Others having the 17α-vinyl, chloroethynyl, etc. groups present are useful as oral progestational agents in the treatment of dysmenorrhea, habitual abortion, menopausal syndrome and the like. The present compounds can be incorporated with fillers, excipients, flavors, etc. and compounded into tablet, capsules, pills and other well known pharmaceutical forms.

The following examples illustrate in detail the preparation of representative compounds of the present invention.

Example 1.—Preparation of 17β-Hydroxy-19-Norandrosta-5(10),9(11)-Dien-3-One

17β-hydroxy-19-norandrosta-4,9(10)-dien-3-one is prepared by the method described in J. Am. Chem. Soc., 82, 2402 (1960). p-Toluenesulfonic acid (100 mg.) is added to a solution of 17β-hydroxy-19-norandrosta-4,9-(10)-dien-3-one (200 mg.) in methanol (4 ml.), methylene chloride (4 ml.) and methyl orthoformate (4 ml.). After 10 minutes pyridine (2 ml.) is added followed by methylene chloride. The mixture is washed with water and dried and the gum obtained by removal of solvent is dissolved in petroleum ether and chromatographed on a synthetic magnesium silicate (10 g.). The gum eluted with 1% acetone in petroleum ether is dissolved in acetone (6 ml.) and dilute sulfuric acid (3 drops; 8% v./v.) is added. After 5 minutes the solution is diluted with water and the mixture is kept in the cold for 1 hour. The material which has separated is collected, dried and crystallized from acetone-petroleum ether to give 17β-hydroxy-19-norandrosta-5(10),9(11)-dien-3-one as needles (90 mg.) melting point about 100–118° C.

Example 2.—Preparation of 17β-Hydroxy-17α-Methyl-19-Norandrosta-5(10),9(11)-Dien-3-One 17β-hydroxy-17α-methyl-19-norandrosta-4,9(10)-dien-3-one [J. Am. Chem. Soc., 82, 2402 (1960)] is treated as in Example 1 above to give the product described above.

Example 3.—Preparation of 17β-Hydroxy-17α-Vinyl-19-Norandrosta-5(10),9(11)-Dien-3-One The product of the example is obtained by treating 17β-hydroxy-17α-vinyl-19-norandrosta-4,9(10)-dien-3-one [J. Am. Chem. Soc., 82, 2402 (1960)] as in Example 1 above.

Example 4.—Preparation of 19-Norpregna-5(10),9(11)-Diene-3,20-Dione

The product of the example is obtained by treating 19-norpregna-4,9(10)-diene-3,20-dione [J. Am. Chem. Soc., 82, 2402 (1960)] as in Example 1 above.

Example 5.—Preparation of 17α-Chloroethynyl-17β-Hydroxy-19-Norandrosta-5(10),9(11)-Dien-3-One The product of the example is obtained by treating 17α-chloroethynyl-17β-hydroxy-19-norandrosta-4,9(10)-dien-3-one [J. Am. Chem. Soc., 83, 4663 (1961)] as in Example 1 above.

We claim:
1. A compound of the formula:

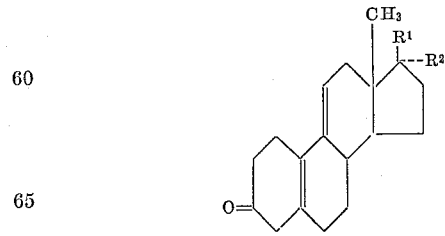

wherein $R^1$ is hydroxyl and $R^2$ is selected from the group consisting of vinyl and chloroethynyl.

2. The compound 17β-hydroxy-17α-vinyl-19-norandrosta-5(10),9(11)-dien-3-one.

3. The compound 17α-chloroethynyl-17β-hydroxy-19-norandrosta-5(10),9(11)-dien-3-one.

4. A method of preparing compounds of the formula:

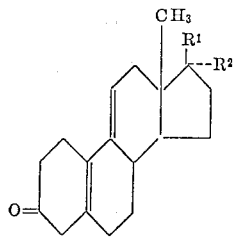

wherein R¹ is selected from the group consisting of hydroxyl and lower alkanoyl and R² is selected from the group consisting of hydrogen, methyl, vinyl, chloroethynyl, and when R² is hydrogen then R¹ is lower alkanoyl which comprises contacting a steroid having the formula:

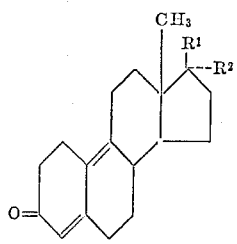

wherein R¹ and R² are defined as above with an orthoformate ester in a solvent inert to the reactants, subsequently hydrolyzing by the addition of a mineral acid and recovering said compound therefrom.

5. A method of preparing 17β-hydroxy-19-norandrosta-5(10),9(11)-dien-3-one which comprises contacting 17β-hydroxy-19-norandrosta-4,9(10)-dien-3-one with a lower alkyl orthoformate in a lower alkyl alcohol, subsequently hydrolyzing the reaction product with a mineral acid and recovering said product therefrom.

6. A method of preparing 17β-hydroxy-17α-methyl-19-norandrosta-5(10),9(11)-dien-3-one which comprises contacting 17β-hydroxy-17α-methyl-19-norandrosta-4,9(10)-dien-3-one with a lower alkyl orthoformate in a lower alkyl alcohol, subsequently hydrolyzing the reaction product with a mineral acid and recovering said product therefrom.

7. A method of preparing 17β-hydroxy-17α-vinyl-19-norandrosta-5(10),9(11)-dien-3-one which comprises contacting 17β-hydroxy-17α-vinyl-19-norandrosta-4,9(10)-dien-3-one with a lower alkyl orthoformate in a lower alkyl alcohol, subsequently hydrolyzing the reaction product with a mineral acid and recovering said product therefrom.

8. A method of preparing 17α-chloroethynyl-17β-hydroxy-19-norandrosta-5(10),9(11)-dien-3-one which comprises contacting 17α-chloroethynyl-17β-hydroxy-19-norandrosta-4,9(10)-dien-3-one with a lower alkyl orthoformate in a lower alkyl alcohol, subsequently hydrolyzing the reaction product with a mineral acid and recovering said product therefrom.

References Cited in the file of this patent
UNITED STATES PATENTS
3,052,672    Nomine et al. _____ Sept. 4, 1962